(12) United States Patent
Chen et al.

(10) Patent No.: US 9,867,227 B2
(45) Date of Patent: *Jan. 9, 2018

(54) METHOD, DEVICE, AND SYSTEM FOR INDICATING DISCONTINUOUS DATA SCHEDULING

(71) Applicant: Huawei Technologies Co., LTD, Shenzhen (CN)

(72) Inventors: Yanyan Chen, Shenzhen (CN); Yongqiang Gao, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 1041 days.

This patent is subject to a terminal disclaimer.

(21) Appl. No.: 13/863,110

(22) Filed: Apr. 15, 2013

(65) Prior Publication Data

US 2013/0229966 A1 Sep. 5, 2013

Related U.S. Application Data

(63) Continuation of application No. 12/965,840, filed on Dec. 11, 2010, now Pat. No. 8,442,565, which is a continuation of application No. PCT/CN2009/072226, filed on Jun. 11, 2009.

(30) Foreign Application Priority Data

Jun. 13, 2008 (CN) .......................... 2008 1 0067759
Aug. 8, 2008 (CN) .......................... 2008 1 0145378

(51) Int. Cl.
*H04W 76/04* (2009.01)
*H04W 28/16* (2009.01)

(52) U.S. Cl.
CPC ......... *H04W 76/048* (2013.01); *H04W 28/16* (2013.01)

(58) Field of Classification Search
CPC .......................... H04W 76/048; H04W 28/16
USPC .......................................................... 370/311
See application file for complete search history.

(56) References Cited

U.S. PATENT DOCUMENTS

| | | | |
|---|---|---|---|
| 7,027,496 B2 | 4/2006 | Tapaninen | |
| 7,941,626 B2 | 5/2011 | Marinier et al. | |
| 8,442,565 B2 * | 5/2013 | Chen | H04W 28/16 370/278 |
| 2006/0117110 A1 | 6/2006 | Vasseur et al. | |

(Continued)

FOREIGN PATENT DOCUMENTS

| | | |
|---|---|---|
| CN | 101036134 A | 9/2007 |
| CN | 101166316 A | 4/2008 |

(Continued)

OTHER PUBLICATIONS

3GPP TS 25.423 v8.0.0, Mar. 2008, pp. 1-859.*

(Continued)

*Primary Examiner* — Andrew Lai
*Assistant Examiner* — Andrew C Lee
(74) *Attorney, Agent, or Firm* — Slater Matsil, LLP

(57) ABSTRACT

A method for indicating discontinuous data scheduling includes receiving discontinuous reception (DRX) indication information on an Iur interface; and sending discontinuous scheduling indication information to a base station according to the DRX indication information. A communication system and a radio network control device for implementing the method are also provided.

20 Claims, 6 Drawing Sheets

(56) References Cited

U.S. PATENT DOCUMENTS

| | | | |
|---|---|---|---|
| 2007/0129017 A1 | 6/2007 | Dalsgaard et al. | |
| 2008/0293426 A1 | 11/2008 | Kim et al. | |
| 2009/0168731 A1 | 7/2009 | Zhang et al. | |
| 2010/0056164 A1 | 3/2010 | Ishii et al. | |
| 2010/0144299 A1 | 6/2010 | Ren | |
| 2010/0232366 A1 | 9/2010 | Iwamura et al. | |
| 2014/0153467 A1* | 6/2014 | Di Girolamo | H04W 68/025 370/311 |

FOREIGN PATENT DOCUMENTS

| | | |
|---|---|---|
| CN | 101170726 A | 4/2008 |
| CN | 100442933 C | 12/2008 |
| CN | 101547479 A | 9/2009 |
| EP | 2 259 619 A1 | 12/2010 |
| KR | 100705040 B1 | 4/2007 |
| WO | WO 2007/015460 A1 | 2/2007 |
| WO | WO 2007/077845 A1 | 7/2007 |
| WO | WO 2008/054103 A1 | 5/2008 |
| WO | 2008069950 A2 | 6/2008 |

OTHER PUBLICATIONS

Notice of Allowance received in U.S. Appl. No. 12/965,840 dated Jan. 16, 2013, 13 pages.

Fourth Chinese Office Action of Chinese Application No. 200810145378.5 and Partial Translation, dated Feb. 5, 2013, 9 pages.

First Chinese Office Action of Chinese Application No. 200980118479.6 and Partial Translation, dated Nov. 27, 2012, 27 pages.

Third Chinese Office Action with Partial English Translation, Chinese Application No. 200810145378.5, dated Jun. 29, 2012, 9 pages.

Second Chinese Office Action, Application No. 200810145378.5, dated Oct. 19, 2011, 8 pages.

3rd Generation Partnership Project; Technical Specification Group Radio Access Network; UTRAN Iur interface RNSAP signalling (Release 8), 3GPP TS 25.423 V8.0.0, Mar. 2008, 3 pages.

Written Opinion of the International Searching Authority, International Application No. PCT/CN2009/072226, dated Sep. 17, 2009, 5 pages.

First Chinese Office Action, Application No. 200810145378.5, dated Jan. 26, 2011, 10 pages.

Nokia Siemens Networks, et al., "Impact on FP spec for Enhanced DRX in Cell_FACH," 3GPP TSG-RAN WG3 Meeting #60, Document for Approval, R3-081278, 3 pages, May 5-9, 2008, Kansas City, USA.

International Search Report, International Application No. PCT/CN2009/072226, dated Sep. 17, 2009, 6 pages.

International Preliminary Report on Patentability, International Application No. PCT/CN2009/072226, Applicant: Huawei Technologies Co., Ltd., dated: Dec. 14, 2010, 12 pages.

Rejection Decision with Partial English Translation received in Chinese Patent Application No. 200810145378.5 dated Jun. 4, 2013, 11 pages.

"3rd Generation Partnership Project; Technical Specification Group Radio Access Network; Evolved Universal Terrestrial Radio Access (E-UTRA) Radio Resource Control (RRC); Protocol Specification (Release 8)," 3GPP TS 36.331 V8.2.0, May 2008, pp. 1-151.

* cited by examiner

METHOD, DEVICE, AND SYSTEM FOR INDICATING DISCONTINUOUS DATA SCHEDULING

This application is a continuation of U.S. patent application Ser. No. 12/965,840, filed on Dec. 11, 2012, which is a continuation of co-pending International Application No. PCT/CN2009/072226, filed Jun. 11, 2009, which designated the United States and was not published in English, and which claims priority to Chinese Application No. 200810067759.6, filed Jun. 13, 2008, and Chinese Application No. 200810145378.5, filed Aug. 8, 2008, all of which application are incorporated herein by reference.

TECHNICAL FIELD

The present invention relates to the field of mobile communication technology and, in particular embodiments, to a technology for discontinuous data scheduling.

BACKGROUND

In order to enable user equipment (UE) in a cell forward access channel (Cell_FACH) state to have a good power saving performance, the UE may perform discontinuous reception (DRX) when receiving data on a high speed downlink shared channel (HS-DSCH). Discontinuous reception performed by the UE in the Cell_FACH state is referred to as enhanced DRX characteristic.

An Iur interface is an interface for interchanging signaling and data between a radio network controller (RNC) and other RNCs. Two technical solutions may be employed to perform data scheduling on the Iur interface when the following situation exists: a UE supports the enhanced DRX characteristic, a service RNC (SRNC) and a control RNC (CRNC) of the UE are not the same network equipment, and the SRNC does not support the enhanced DRX characteristic and the CRNC supports the enhanced DRX characteristic.

In Solution I, DRX parameter information is delivered on a broadcast channel. The UE supporting the enhanced DRX characteristic performs discontinuous reception when the UE receives the DRX parameter information on the broadcast channel. When the SRNC dose not support the enhanced DRX characteristic, and the CRNC supports the enhanced DRX characteristic, the CRNC releases a radio resource control (RRC) connection of the UE.

The release of the RRC connection interrupts services of the UE and therefore influences the continuity of the service of the UE.

In Solution II, the DRX parameter information is delivered to the UE in a dedicated RRC message, and the UE performs discontinuous reception after receiving the DRX parameter information. If the UE does not receive the DRX parameter information, the UE performs continuous reception.

Because the CRNC sends the DRX parameter information to the SRNC only after the SRNC notifies the CRNC of capability information that the UE supports the enhanced DRX characteristic. If the SRNC does not support the enhanced DRX characteristic, the SRNC does not notify the CRNC of the capability information that the UE supports the enhanced DRX characteristic. Accordingly, the CRNC does not send the DRX parameter information to the SRNC, and the dedicated RRC message delivered by the SRNC does not contain the DRX parameter information. As a result, the UE performs continuous reception. Therefore, when the SRNC does not support the enhanced DRX characteristic, the UE cannot use the enhanced DRX characteristic.

SUMMARY OF THE INVENTION

Embodiments of the present invention provide a method, device, and system for discontinuous data scheduling, so as to achieve the objective that an RNC sends a discontinuous scheduling indication to a base station.

An embodiment of the present invention provides a method for indicating discontinuous data scheduling. The method includes receiving, on an Iur interface, DRX indication information sent by an SRNC and sending discontinuous scheduling indication information to a base station according to the DRX indication information.

An further embodiment of the present invention provides a radio network control device that includes a receiving unit that is configured to receive DRX indication information on an Iur interface. A sending unit is configured to send discontinuous scheduling indication information to a base station according to the DRX indication information.

Another embodiment of the present invention provides a communication system that includes a first radio network control device that is configured to receive capability information reported by a UE about the support for an enhanced DRX characteristic and to send DRX indication information to a second radio network control device. The second radio network control device is configured to receive the DRX indication information on an Iur interface and to send discontinuous scheduling indication information to a base station according to the DRX indication information.

By using the technical solutions of the present invention, the objective that an RNC sends a discontinuous scheduling indication to a base station is achieved, and a UE that supports the enhanced DRX characteristic is enabled to perform discontinuous reception.

DETAILED DESCRIPTION OF ILLUSTRATIVE EMBODIMENTS

In the following, the technical solutions of the present invention are described in detail with reference to the accompanying drawings.

Embodiment 1

Figure 1:
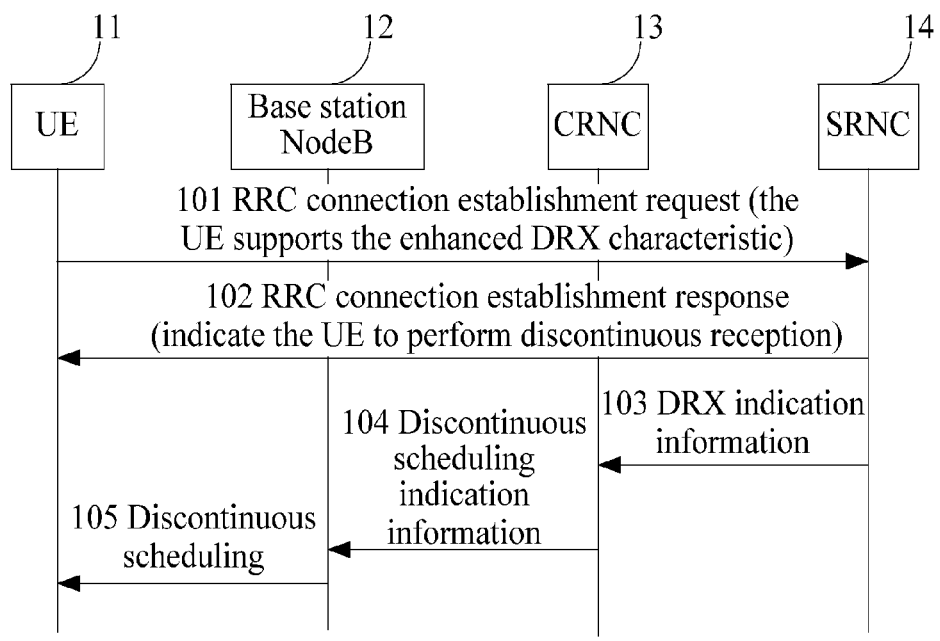
FIG. 1 is a flow chart of a method for indicating discontinuous data scheduling according to Embodiment 1 of the present invention.

In this embodiment, a CRNC 13 and an SRNC 14 of a UE 11 are different network equipment, and the UE 11, the CRNC 13, and the SRNC 14 all support the enhanced DRX characteristic. The technical solution of this embodiment is described now. The CRNC 13 receives, on an Iur interface, an Iur data frame sent by the SRNC 14, where the Iur data frame carries DRX indication information; the CRNC 13 knows that the Iur data frame requires discontinuous scheduling according to the DRX indication information carried in the Iur data frame, and sends discontinuous scheduling indication information to a base station NodeB 12. As shown in FIG. 1, this embodiment includes the following steps.

In step 101, the UE 11 reports capability information about the support for the enhanced DRX characteristic to the SRNC 14.

In this step, the UE 11 reports the capability information about the support for the enhanced DRX characteristic by using at least one of the following methods reporting through an RRC connection establishment request message, reporting through an RRC connection establishment complete message, and reporting through a cell update message.

In step 102, if whether the UE 11 performs discontinuous reception is a configurable characteristic, and the SRNC 14 knows that the UE 11 supports the enhanced DRX characteristic, the SRNC 14 may determine to set the UE 11 to use discontinuous reception according to the specific service condition of the UE 11. In addition, the SRNC 14 carries indication information in dedicated RRC signaling delivered by the SRNC 14 to instruct a UE to perform discontinuous reception.

If both the UE 11 and cells in a control range of the CRNC 13 where the UE 11 is located support the enhanced DRX characteristic, the UE 11 must use the enhanced DRX characteristic, that is, whether the UE 11 uses discontinuous reception is not a configurable characteristic. Accordingly, after the SRNC 14 knows that the UE 11 supports the enhanced DRX characteristic, the SRNC 14 may use the DRX indication information to notify the CRNC 13 of the capability about that the UE 11 supports the enhanced DRX characteristic.

If the SRNC 14 does not support the enhanced DRX characteristic, the indication information in this step does not exist, and the UE 11 performs continuous data reception.

The dedicated RRC signaling in this step includes an RRC connection establishment message, a cell update confirmation message, and other messages used to perform resource reconfiguration for the UE 11, for example, physical channel reconfiguration, transport channel reconfiguration, radio bearer reconfiguration, and radio bearer establishment.

In step 103, the SRNC 14 sends an Iur data frame of the UE 11 to the CRNC 13 on the Iur interface. The Iur data frame carries DRX indication information, for example, DRX Indication, and the DRX indication information indicates to perform discontinuous scheduling on the Iur data frame.

In step 104, after receiving the Iur data frame, the CRNC 13 transmits a data frame that is sent to the UE 11 to the base station NodeB 12. The data frame carries discontinuous scheduling indication information, for example, DRX Indication, to notify the NodeB that the NodeB needs to perform discontinuous scheduling on the downlink data delivered to the UE 11.

In step 105, the NodeB receives the data frame, and performs discontinuous scheduling on the downlink data of the UE 11.

In this embodiment, a method for indicating discontinuous data scheduling is provided. In this method, the SRNC knows that the Iur data frame requires discontinuous scheduling according to the DRX indication information carried in the Iur data frame, and thus instructs the base station to perform discontinuous scheduling, so that a UE that supports the enhanced DRX characteristic is enabled to perform discontinuous reception.

Embodiment 2

Figure 2:
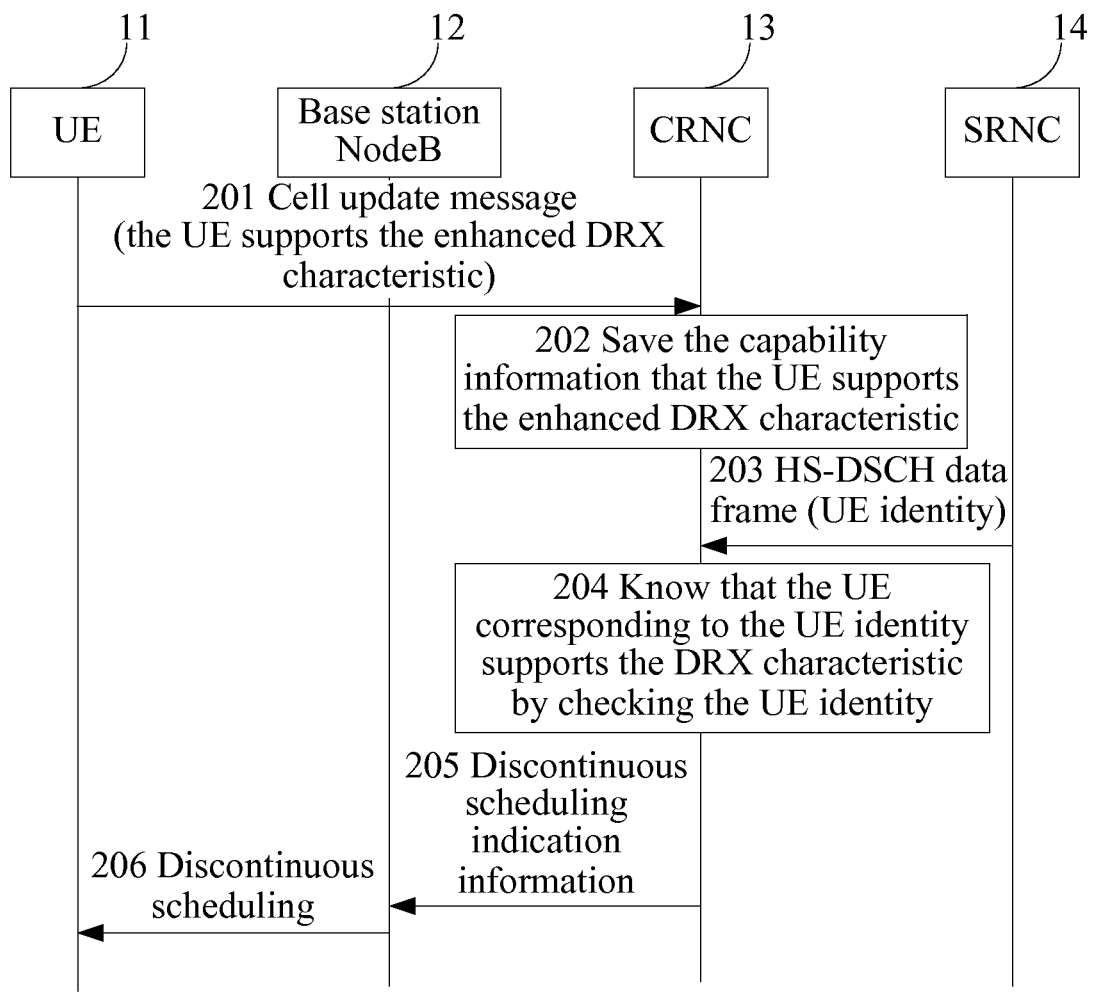
FIG. 2 is a flow chart of a method for indicating discontinuous data scheduling according to Embodiment 2 of the present invention.

In this embodiment, a CRNC 13 and an SRNC 14 of a UE 11 are different network equipment, and the UE 11 and the CRNC 13 both support the enhanced DRX characteristic. This embodiment can be described as follows. The UE 11 reports capability information about the support for the enhanced DRX characteristic to the CRNC 13, so as to enable the CRNC 13 to know the information that the UE 11 supports the enhanced DRX characteristic. When the CRNC 13 receives an Iur data frame, the CRNC 13 knows that the Iur data frame requires discontinuous scheduling according to a UE identity in the Iur data frame and the capability information that the UE 11 supports the enhanced DRX characteristic. Thus the CRNC 13 instructs a base station to perform discontinuous scheduling on the data. As shown in FIG. 2, this embodiment includes the following steps.

In step 201, the UE 11 sends a cell update message. The cell update message carries capability information that the UE 11 supports the DRX characteristic.

In step 202, the CRNC 13 receives the cell update message, and knows that the UE 11 supports the enhanced DRX characteristic. Furthermore, the CRNC 13 saves the capability information that the UE 11 supports the enhanced DRX characteristic.

In step 203, the CRNC 13 receives an Iur data frame from the SRNC 14. In this embodiment, the Iur data frame is, for example, an HS-DSCH data frame.

In step 204, the CRNC 13 checks whether the UE to which the Iur data frame belongs supports the enhanced DRX characteristic according to a UE identity in the Iur data frame. In this embodiment, the CRNC 13 knows that the data frame is a data frame delivered to the UE 11 that supports the enhanced DRX characteristic according to the UE identity in the HS-DSCH data frame.

It should be noted that, when the CRNC 13 supports the enhanced DRX characteristic, if the cells in a control range of the CRNC 13 are not forced to support the enhanced DRX characteristic, the CRNC 13 needs to further determine whether the cell where the UE is located supports the enhanced DRX characteristic. That is, before step 204, the CRNC 13 needs to acquire capability information about whether the cells in the control range of the CRNC 13 support the enhanced DRX characteristic.

In step 205, the CRNC 13 transmits a data frame that is sent to the UE 11 to the NodeB 12. The data frame carries discontinuous scheduling indication information, for example, DRX Indication.

In step 206, the NodeB 12 receives the data frame carrying the discontinuous scheduling indication information, and performs discontinuous scheduling on the downlink data of the UE 11.

In this embodiment, a method for discontinuous data scheduling is provided. When the UE supports the enhanced DRX characteristic, the objective that the network performs discontinuous scheduling of the downlink data of the UE is achieved. If the UE and the service cell of the UE support the enhanced DRX characteristic, the CRNC sends the discontinuous scheduling indication to the NodeB regardless of whether the SRNC supports the enhanced DRX characteristic. In addition, the NodeB performs discontinuous scheduling on the downlink data of the UE, so that a UE that supports the enhanced DRX characteristic is enabled to perform discontinuous reception.

Embodiment 3

Figure 3:
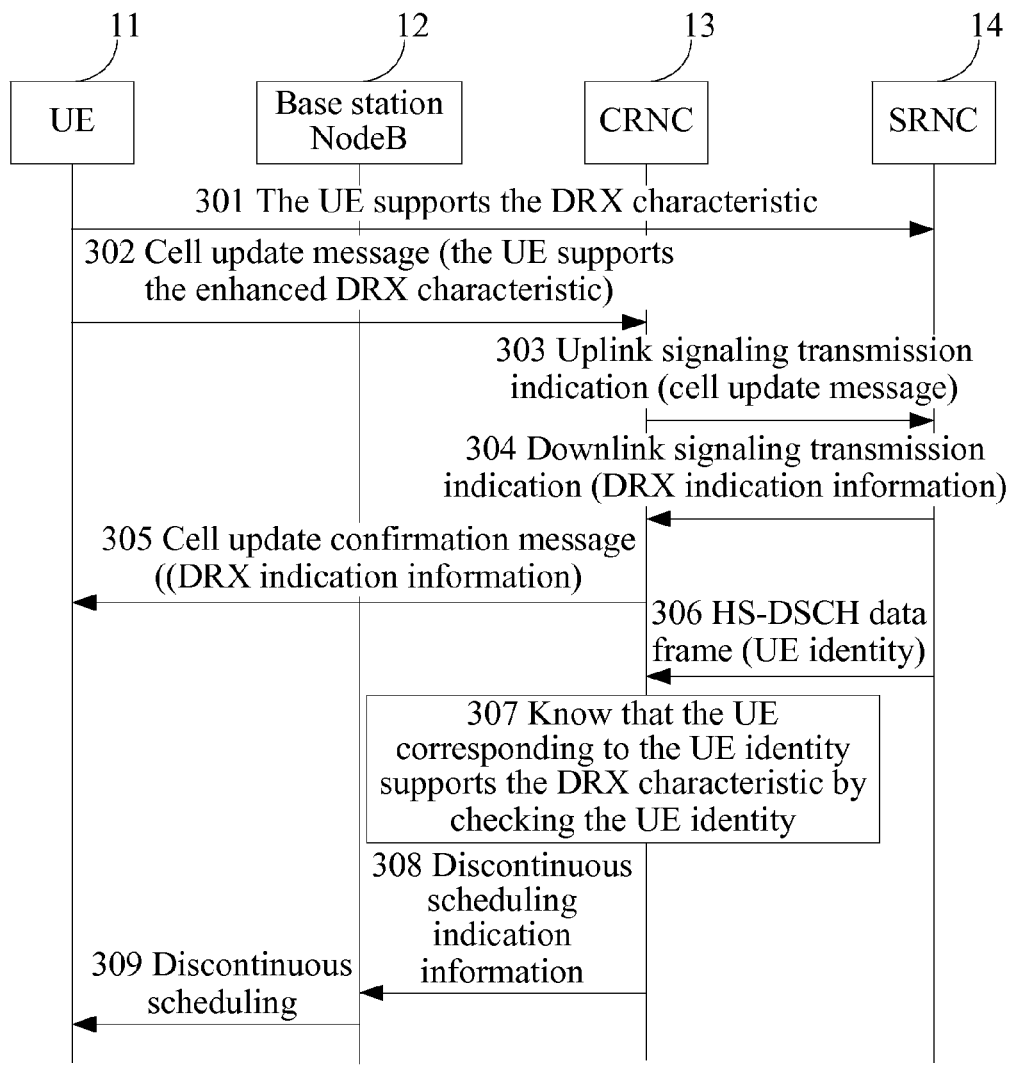
FIG. 3 is a flow chart of a method for indicating discontinuous data scheduling according to Embodiment 3 of the present invention.

In this embodiment, a CRNC 13 and an SRNC 14 of a UE 11 are different network equipment, and the UE 11, the CRNC 13, and the SRNC 14 all support the DRX characteristic. This embodiment can be described as follows. The CRNC 13 knows that the UE 11 is set to perform discontinuous reception from DRX indication information carried in Iur interface signaling, and knows that an Iur data frame of a user requires discontinuous scheduling according to the information that the UE 11 is set to perform discontinuous reception and a UE identify in the Iur data frame, and thus instructs a base station to perform discontinuous scheduling. As shown in FIG. 3, this embodiment includes the following steps.

In step 301, the UE 11 reports capability information about the support for the DRX characteristic to the SRNC 14, and the SRNC 14 knows that the UE 11 supports the enhanced DRX characteristic.

In this embodiment, the UE 11 reports the capability information about the support for the DRX characteristic through, for example, an RRC connection establishment request message.

In step 302, the UE 11 enters a cell in a control range of the CRNC 13, and sends a cell update message to a network side.

In step 303, after receiving the cell update message, the CRNC 13 carries the cell update message in an uplink signaling transmission indication and sends the uplink signaling transmission indication to the SRNC 14.

In step 304, if whether the UE 11 performs discontinuous reception is a configurable characteristic, the SRNC 14 that supports the enhanced DRX characteristic determines to set the UE 11 to use the enhanced DRX characteristic according to the service condition of the UE, and sends DRX indication information to the CRNC 13 through Iur interface signaling, where the DRX indication information indicates that the UE 11 is set to use discontinuous reception. In this embodiment, the DRX indication information is carried in, for example, a downlink signaling transmission indication. The DRX indication information may also be carried in other Iur interface signaling, for example, a common transport channel resource request.

It should be noted that, if the SRNC 14 determines to set the UE 11 not to use the enhanced DRX characteristic, or the SRNC 14 does not support the enhanced DRX characteristic, an corresponding indication may be added to the Iur interface signaling; or, when the Iur interface signaling does not carry the DRX indication information, it is considered that the UE 11 is not set to use the enhanced DRX characteristic.

The CRNC 13 may save the information that the UE 11 is set to use discontinuous reception, and for example, save the information in a context of the UE 11.

In step 305, the CRNC 13 sends DRX indication information to the UE 11, to instruct the UE 11 to perform discontinuous reception, and in this embodiment, the DRX indication information is carried, for example, in a cell update confirmation message.

In step 306, the CRNC 13 receives an Iur data frame from the SRNC 14, and in this embodiment, the Iur data frame is, for example, an HS-DSCH data frame.

In step 307, the CRNC 13 checks whether the Iur data frame is a data frame delivered to the UE 11 that supports the enhanced DRX characteristic according to a UE identity in the Iur data frame. In this embodiment, the CRNC 13 knows that the Iur data frame is a data frame delivered to the UE 11 that supports the enhanced DRX characteristic according to the UE identity in the HS-DSCH data frame.

In step 308, the CRNC 13 transmits a data frame that is sent to the UE 11 to the NodeB 12, in which the data frame carries discontinuous scheduling indication information, for example, DRX Indication.

In step 309, the NodeB 12 receives the data frame carrying the discontinuous scheduling indication information, and performs discontinuous scheduling on the downlink data of the UE 11.

In this embodiment, a method for indicating discontinuous data scheduling is provided. The CRNC knows that the UE is set to perform discontinuous reception according to the DRX indication information carried in the Iur interface signaling, and obtains Iur data frames that require discontinuous scheduling according to the information that the UE is set to perform discontinuous reception and the UE identity in the Iur data frame, and therefore the CRNC instructs the base station to perform discontinuous scheduling, so that a UE that supports the enhanced DRX characteristic is enabled to perform discontinuous reception.

Embodiment 4

Figure 4:
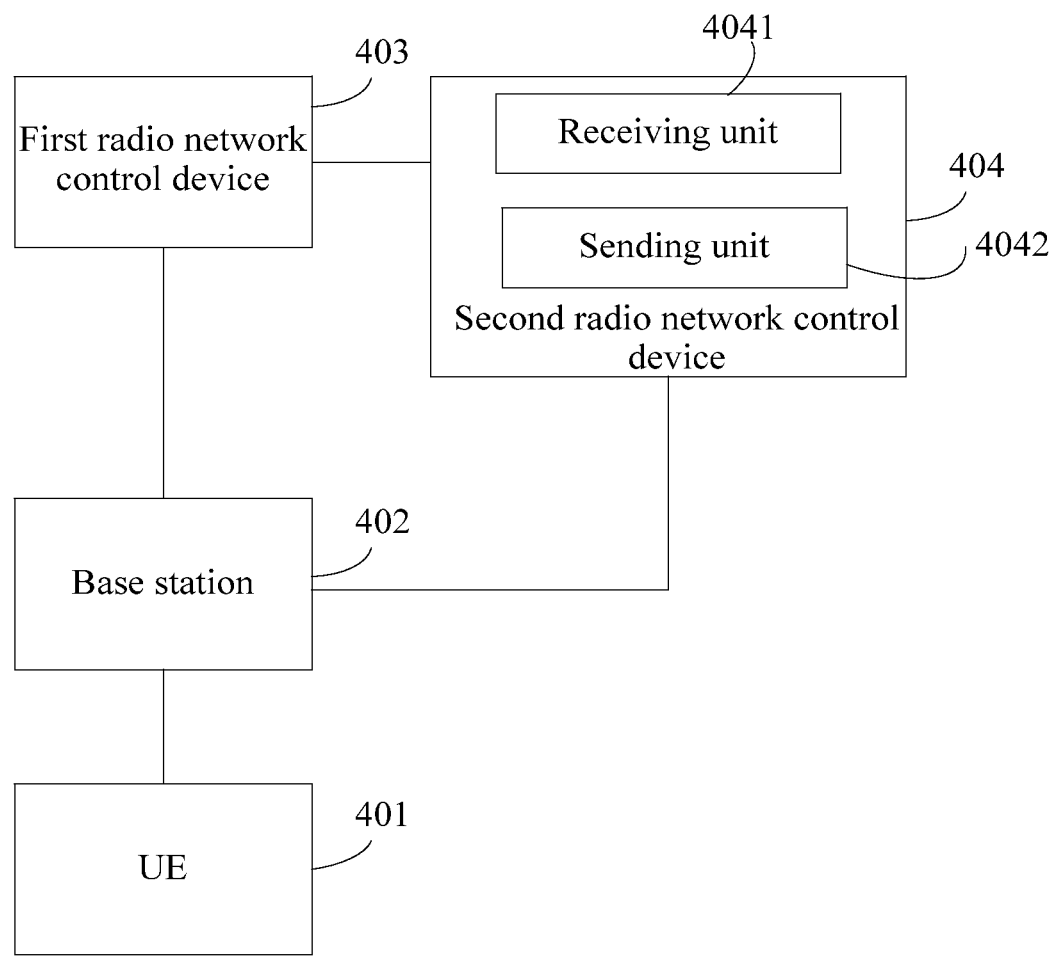
FIG. 4 is a schematic diagram of a communication system and a radio network control device according to Embodiment 4 of the present invention.

In this embodiment, a communication system and a radio network control device are provided. As shown in FIG. 4, the communication system includes a UE 401, a base station 402, a first radio network control device 403, and a second radio network control device 404.

The UE 401 is configured to report capability information about the support for the enhanced DRX characteristic to the first radio network control device 403.

The first radio network control device 403 is configured to receive the capability information reported by the UE 401 about the support for the enhanced DRX characteristic, set the UE 401 to use discontinuous reception, and send DRX indication information to the second radio network control device 404.

The second radio network control device 404 is configured to receive the DRX indication information on an Iur interface, and send discontinuous scheduling indication information to the base station 402 according to the DRX indication information.

The radio network control device of this embodiment is applied to the communication system of this embodiment, that is, the second radio network control device. As shown in FIG. 4, the second radio network control device 404 includes: a receiving unit 4041 and a sending unit 4042. The receiving unit 4041 is configured to receive the DRX indication information on the Iur interface, and the sending unit 4042 is configured to send the discontinuous scheduling indication information to the base station 404 according to the DRX indication information.

The DRX indication information may be carried in an Iur data frame, and the DRX indication information indicates to perform discontinuous scheduling on the Iur data frame. The DRX indication information may also be carried in Iur interface signaling, and at this time, the DRX indication information indicates that the UE is set to perform discontinuous reception.

It should be noted that, when the methods of Embodiment 1 and Embodiment 3 are implemented by using the communication system of this embodiment, the first radio network control device and the second radio network control device of this embodiment correspond to the SRNC and the CRNC in Embodiment 1 and Embodiment 3 respectively.

In the communication system and the radio network control device of this embodiment, the radio network control device instructs the base station to perform discontinuous scheduling according to the DRX indication information carried in the Iur data frame or the Iur interface signaling, so that a UE that supports the enhanced DRX characteristic is enabled to perform discontinuous reception.

Embodiment 5

Figure 5:
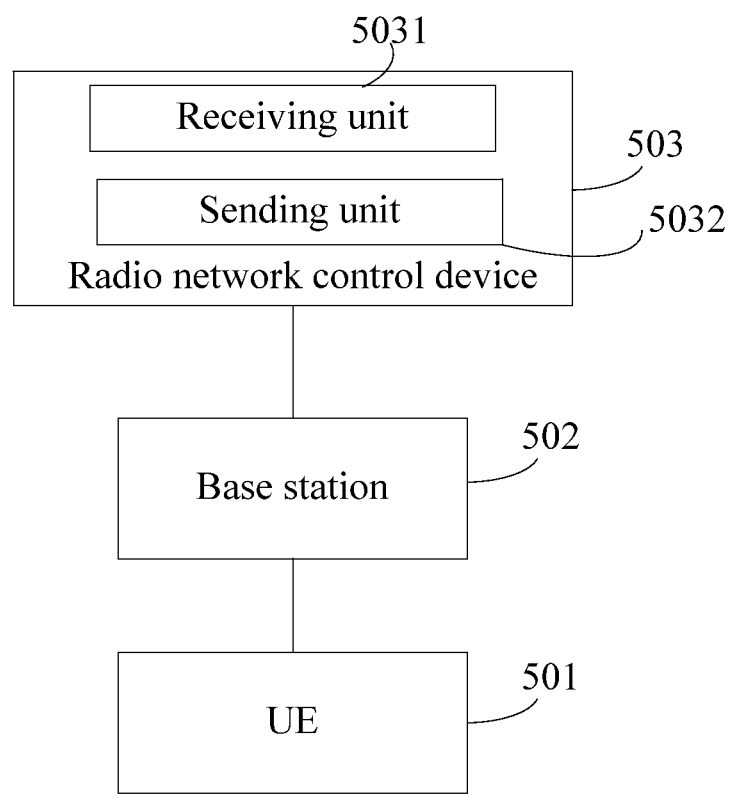
FIG. 5 is a schematic diagram of a communication system and a radio network control device according to Embodiment 5 of the present invention.

In this embodiment, a communication system and a radio network control device are provided. As shown in FIG. 5, the communication system includes a UE 501, a base station 502, and a radio network control device 503.

The UE 501 is configured to report capability information about the support for the enhanced DRX characteristic.

The radio network control device 503 is configured to receive an Iur data frame, and send discontinuous scheduling indication information to the base station 502 according to a UE identity in the Iur data frame and the capability information that the UE supports the enhanced DRX characteristic.

The radio network control device of this embodiment is applied to the communication system of this embodiment, that is, the radio network control device 503. As shown in FIG. 5, the radio network control device 503 further includes a receiving unit 5031 and a sending unit 5032. The receiving unit 5031 is configured to receive the capability information reported by the UE 501 about the support for the enhanced DRX characteristic. The sending unit 5032 is configured to receive the Iur data frame, and send the discontinuous scheduling indication information to the base station 502 according to the UE identity in the Iur data frame and the capability information that the UE supports the enhanced DRX characteristic.

In the communication system and the radio network control device of this embodiment, when the UE supports the enhanced DRX characteristic, the objective that the network performs discontinuous scheduling of the downlink data of the UE is achieved. If the UE and the service cell of the UE support the enhanced DRX characteristic, the CRNC sends the discontinuous scheduling indication to the base station regardless of whether the service radio network control device supports the enhanced DRX characteristic, and the base station performs discontinuous scheduling on the downlink data of the UE, so that a UE that supports the enhanced DRX characteristic is enabled to perform discontinuous reception.

Embodiment 6

Figure 6:
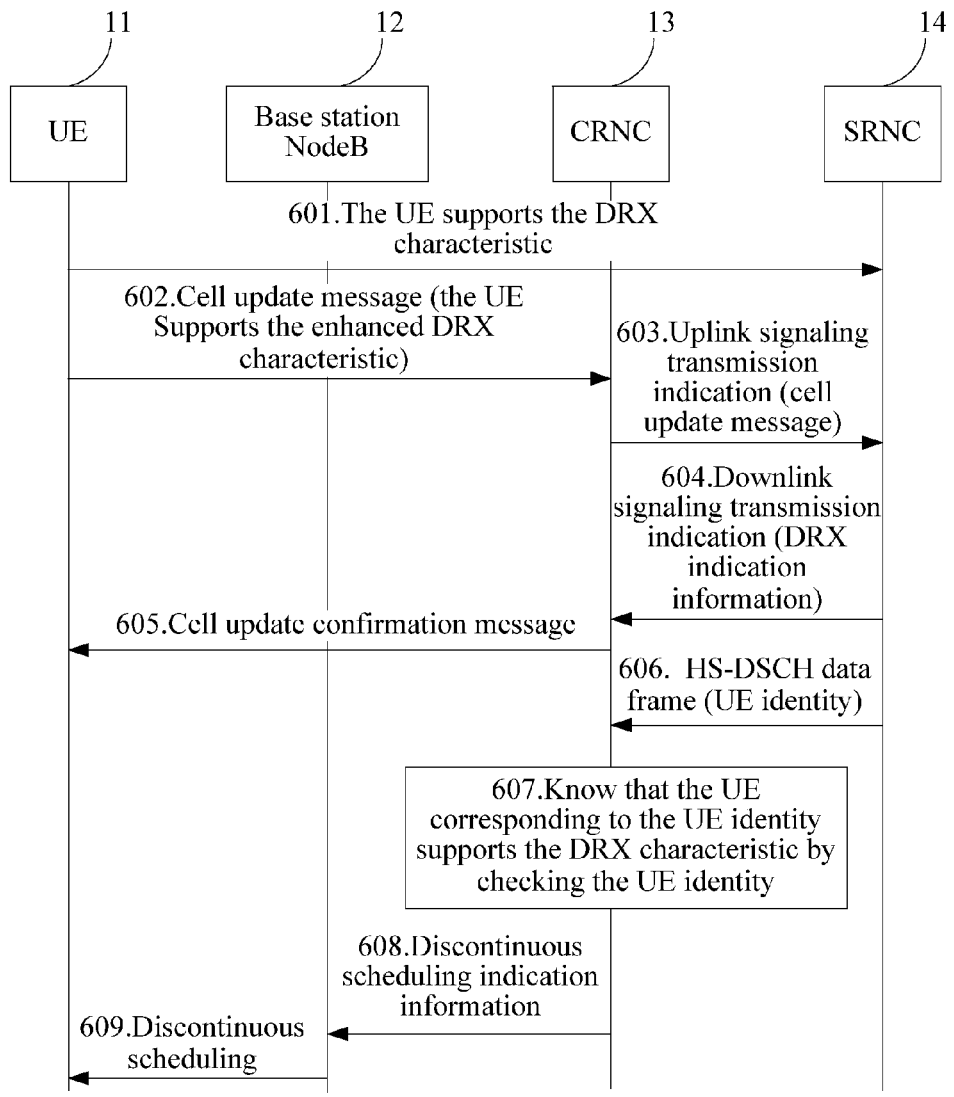
FIG. 6 is a flow chart of a method for indicating discontinuous data scheduling according to Embodiment 6 of the present invention.

In this embodiment, a CRNC 13 and an SRNC 14 of a UE 11 are different network equipment, and the UE 11, the CRNC 13, and the SRNC 14 all support the DRX characteristic. This embodiment can be described as follows. The CRNC 13 knows capability information that the UE 11 supports the enhanced DRX from DRX indication information carried in Iur interface signaling, and knows that an Iur data frame of a user requires discontinuous scheduling according to the capability information that the UE 11 supports the enhanced DRX and a UE identity in the Iur data frame, and thus instructs a base station to perform discontinuous scheduling. As shown in FIG. 6, this embodiment includes the following steps.

In step 601, the UE 11 reports the capability information about the support for the DRX characteristic to the SRNC 14, and the SRNC 14 knows that the UE 11 supports the enhanced DRX characteristic.

In this embodiment, the UE 11 reports the capability information about the support for the DRX characteristic through, for example, an RRC connection establishment request message.

In step 602, the UE 11 enters a cell in a control range of the CRNC 13, and sends a cell update message to a network side.

In step 603, after receiving the cell update message, the CRNC 13 carries the cell update message in an uplink signaling transmission indication and sends the uplink signaling transmission indication to the SRNC 14.

In step 604, if the UE 11 and cells in the control range of the CRNC 13 where the UE 11 is located support the enhanced DRX characteristic, the UE 11 must use the enhanced DRX characteristic, that is, whether the UE 11 uses discontinuous reception is not a configurable characteristic, and accordingly, after the SRNC 14 knows that the UE 11 supports the enhanced DRX characteristic, the SRNC 14 may use the DRX indication information to notify the CRNC 13 of the capability information about the support for the enhanced DRX characteristic of the UE 11. In this embodiment, the DRX indication information is carried in, for example, a downlink signaling transmission indication. The DRX indication information may also be carried in other Iur interface signaling, for example, a common transport channel resource request.

If the Iur interface signaling does not carry the DRX indication information, it is considered that the UE does not support the enhanced DRX characteristic.

The CRNC 13 may save the capability information that the UE 11 supports the enhanced DRX, and for example, save the information in a context of the UE 11.

In step 605, the CRNC 13 sends a cell update confirmation message to the UE 11.

In step 606, the CRNC 13 receives an Iur data frame from the SRNC 14. In this embodiment, the Iur data frame is, for example, an HS-DSCH data frame.

In step 607, the CRNC 13 checks whether the Iur data frame is a data frame delivered to the UE that supports the enhanced DRX characteristic according to a UE identity in the Iur data frame. In this embodiment, the CRNC 13 determines whether the data frame requires discontinuous scheduling according to the UE identity in the HS-DSCH data frame and the capability information of whether the UE 11 supports the enhanced DRX that is obtained in step 604.

In step 608, the CRNC 13 transmits a data frame that is sent to the UE 11 to the NodeB 12. The data frame carries discontinuous scheduling indication information, for example, DRX Indication.

In step 609, the NodeB 12 receives the data frame carrying the discontinuous scheduling indication information, and performs discontinuous scheduling on the downlink data of the UE 11.

In this embodiment, a method for indicating discontinuous data scheduling is provided. The CRNC knows the capability information that the UE supports the enhanced DRX according to the DRX indication information carried in the Iur interface signaling, and obtains Iur data frames that require discontinuous scheduling according to the capability information that the UE supports the enhanced DRX and the UE identity in the Iur data frame, and therefore the CRNC instructs the base station to perform discontinuous scheduling, so that a UE that supports the enhanced DRX characteristic is enabled to perform discontinuous reception.

A part of the steps in the embodiments of the present invention may be implemented by software, and the corresponding software programs may be stored in a readable storage medium, for example, an optical disk or a hard disk.

The specific embodiments are not intended to limit the present invention. Persons of ordinary skill in the art should understand that any modification, equivalent replacement, or improvement made without departing from the principle of the present invention should fall within the scope of the present invention.

What is claimed is:

1. A method for discontinuous data scheduling, comprising:
    sending, by user equipment (UE) when the UE supports an enhanced discontinuous reception (DRX) characteristic, capability information about a support for an enhanced DRX characteristic to a serving radio network controller (SRNC), so that the SRNC sends indication information indicating that the UE supports the enhanced DRX characteristic to a control radio network controller (CRNC);
    receiving, by the UE, downlink data that is delivered to the UE by discontinuous scheduling the UE, wherein the discontinuous scheduling is performed by a base station according to the indication information when the base station receives a data frame carrying the indication information from the CRNC.

2. The method according to claim 1, wherein the capability information is carried in a cell update message.

3. The method according to claim 1, wherein the capability information is carried in a radio resource control (RRC) connection establishment request message.

4. The method according to claim 1, wherein the capability information is carried in an RRC connection establishment complete message.

5. A device for discontinuous data scheduling, applied to user equipment (UE), comprising:
    a processor; and
    a non-transitory computer readable storage medium, wherein the non-transitory computer readable storage medium stores a program, the program including instructions for:
        sending, when the UE supports an enhanced discontinuous reception (DRX) characteristic, capability information about a support for an enhanced DRX characteristic to a serving radio network controller (SRNC), so that the SRNC sends indication information indicating that the UE supports the enhanced DRX characteristic to a control radio network controller (CRNC);
        receiving, by the UE, downlink data that is delivered to the UE by discontinuous scheduling the UE, wherein the discontinuous scheduling is performed by a base station according to the indication information when the base station receives a data frame carrying the indication information from the CRNC.

6. The device according to claim 5, wherein the capability information is carried in a cell update message.

7. The device according to claim 5, wherein the capability information is carried in a radio resource control (RRC) connection establishment request message.

8. The device according to claim 5, wherein the capability information is carried in an RRC connection establishment complete message.

9. A method for discontinuous data scheduling, comprising:
    receiving, by a serving radio network controller (SRNC) from user equipment (UE), capability information about a support for an enhanced discontinuous reception (DRX) characteristic; and
    transmitting, by the SRNC, indication information indicating that the UE supports the enhanced DRX characteristic to a control radio network controller (CRNC), so that the indication information is carried in a data frame and sent to a base station through the CRNC.

10. The method according to claim 9, wherein the receiving the capability information comprises:
    receiving a cell update message from the UE, wherein the cell update message carries the capability information.

11. The method according to claim 9, wherein the receiving the capability information comprises:
    receiving a radio resource control (RRC) connection establishment request message from the UE, wherein the RRC connection establishment message carries the capability information.

12. The method according to claim 9, wherein the receiving the capability information comprises:
    receiving an RRC connection establishment complete message from the UE, wherein the RRC connection establishment complete message carries the capability information.

13. The method according to claim 9, wherein transmitting the indication information comprises:
    transmitting an Iur data frame to the CRNC, wherein the Iur data frame carries the indication information.

14. A device for discontinuous data scheduling, applied to a serving radio network controller (SRNC), the device comprising:
    a processor; and
    a non-transitory computer readable storage medium, wherein the non-transitory computer readable storage medium stores a program, the program including instructions for:
        receiving, from user equipment (UE), capability information about a support for an enhanced discontinuous reception (DRX) characteristic; and
        transmitting indication information indicating that the UE supports the enhanced DRX characteristic to a control radio network controller (CRNC), so that the indication information is carried in a data frame and sent to a base station through the CRNC.

15. The device according to claim 14, wherein the program further includes instructions for:
    receiving a message from the UE, wherein the message carries the capability information, and the message comprises a cell update message, a radio resource control (RRC) connection establishment request message, or an RRC connection establishment complete message.

16. The device according to claim 14, wherein the program-further includes instructions for:
    transmitting an Iur data frame to the CRNC, wherein the Iur data frame carries the indication information.

17. A method for discontinuous data scheduling, comprising:
    receiving, by a control radio network controller (CRNC), indication information from a serving radio network controller (SRNC), wherein the indication information indicates that user equipment (UE) supports an enhanced DRX characteristic; and sending, by the CRNC, a data frame to a base station, wherein the data frame carries the indication information.

18. The method according to claim 17, wherein receiving the indication information comprises:
receiving, by the CRNC, an Iur data frame from the SRNC, wherein the Iur data frame carries the indication information.

19. A device for discontinuous data scheduling, applied to a control radio network controller (CRNC), the device comprising:
a processor; and
a non-transitory computer readable storage medium, wherein the non-transitory computer readable storage medium stores a program, the program including instructions for:
receiving indication information from a serving radio network controller (SRNC), wherein the indication information indicates that user equipment (UE) supports an enhanced DRX characteristic; and
sending a data frame to a base station, wherein the data frame carries the indication information.

20. The device according to claim 19, wherein the program further includes instructions for:
receiving an Iur data frame from the SRNC, wherein the Iur data frame carries the indication information.

* * * * *